US012663667B2

(12) United States Patent
Tanaka et al.

(10) Patent No.: US 12,663,667 B2
(45) Date of Patent: *Jun. 23, 2026

(54) WAVELENGTH TUNABLE DEVICE

(71) Applicant: NTT, Inc., Tokyo (JP)

(72) Inventors: Yurina Tanaka, Tokyo (JP); Yuichi Akage, Tokyo (JP); Takashi Sakamoto, Tokyo (JP); Soichi Oka, Tokyo (JP)

(73) Assignee: NTT, INC., Tokyo (JP)

( * ) Notice: Subject to any disclaimer, the term of this patent is extended or adjusted under 35 U.S.C. 154(b) by 697 days.

This patent is subject to a terminal disclaimer.

(21) Appl. No.: 18/007,863

(22) PCT Filed: Jun. 12, 2020

(86) PCT No.: PCT/JP2020/023182
§ 371 (c)(1),
(2) Date: Dec. 2, 2022

(87) PCT Pub. No.: WO2021/250886
PCT Pub. Date: Dec. 16, 2021

(65) Prior Publication Data
US 2024/0280843 A1     Aug. 22, 2024

(51) Int. Cl.
*G02F 1/03*          (2006.01)
*G02F 1/21*          (2006.01)
*G02F 1/23*          (2006.01)

(52) U.S. Cl.
CPC ............ *G02F 1/0305* (2013.01); *G02F 1/213* (2021.01); *G02F 1/23* (2013.01)

(58) Field of Classification Search
None
See application file for complete search history.

(56) References Cited

U.S. PATENT DOCUMENTS

| | | | | |
|---|---|---|---|---|
| 5,218,422 A | * | 6/1993 | Zoechbauer | G01J 3/26 356/454 |
| 5,830,208 A | * | 11/1998 | Muller | A61B 18/203 606/9 |
| 11,307,478 B2 | * | 4/2022 | Shinto | G01J 3/32 |
| 2011/0149365 A1 | * | 6/2011 | Cho | H01S 5/02438 359/578 |
| 2014/0091211 A1 | * | 4/2014 | Kitahara | G01J 3/26 359/578 |

(Continued)

FOREIGN PATENT DOCUMENTS

| | | |
|---|---|---|
| JP | 2017126037 A | 7/2017 |

*Primary Examiner* — Sharrief I Broome
*Assistant Examiner* — Journey F Sumlar
(74) *Attorney, Agent, or Firm* — Slater Matsil, LLP

(57) ABSTRACT

A temperature regulating unit is attached to a first incident surface of a first component through a first transparent electrode. The temperature regulating unit is composed of a Peltier element. The temperature regulating unit includes an opening through which the target light can pass. The temperature regulating unit has, for example, a rectangular parallelepiped outer shape in which a surface perpendicular to an optical axis is square-shaped. The opening is formed to penetrate through the temperature regulating unit in a direction perpendicular to the optical axis and has a circular shape in a plan view.

18 Claims, 6 Drawing Sheets

(56)          References Cited

U.S. PATENT DOCUMENTS

2014/0092479 A1*   4/2014  Nishimura  ........... G02B 26/001
                                                  359/578
2015/0309339 A1*  10/2015  Yu ........................ G02F 1/0147
                                                  359/288

* cited by examiner

108a

108

WAVELENGTH TUNABLE DEVICE

CROSS-REFERENCE TO RELATED APPLICATIONS

This application is a national phase entry of PCT Application No. PCT/JP2020/023182, filed on Jun. 12, 2020, which application is hereby incorporated herein by reference.

TECHNICAL FIELD

The present invention relates to a wavelength tunable device that includes a wavelength tunable optical filter.

BACKGROUND

A wavelength tunable optical filter capable of extracting a desired wavelength from a multi-wavelength input and controlling the extracted wavelength has been used for various systems such as bioimaging systems and communication applications. For example, an optical coherence tomography (OCT) is known as a bioimaging technique. This is a technique that allows acquisition of tomographic information of a living tissue, in particular using a wavelength-swept light source as a technique enabling high-speed measurement. This technique uses an interferometer using wavelength-swept light to obtain a beat frequency corresponding to an optical path difference and has a configuration without a moving stage, which allows acquisition of tomographic information at high speed.

In this technique, a measurement time at one point depends on a sweep time of a light source, and the faster the sweep time is, the shorter the measurement time becomes. Thus, especially for a wide range of measurement, a short measurement time is desired. That is, shortening of a sweep time is desired. A wavelength tunable optical filter is one of the mechanisms for performing wavelength sweeping, and the increase in the operation speed of this optical filter can increase the operation speed of a light source.

As a wavelength tunable optical filter based on Fabry-Perot interferometer capable of high-speed operation, a technique using a KTN crystal has been proposed (Patent Literature 1). Application of an electric field to dielectric material having an electrostrictive effect causes crystal strain depending on the magnitude of the electric field. By configuring a resonator structure using plate-like components made of such dielectric material, it is possible to obtain a wavelength tunable optical filter in which a resonator length can be changed by electric field control.

CITATION LIST

Patent Literature

Patent Literature 1: JP 2017-126037 A

SUMMARY

Technical Problem

In the wavelength tunable optical filter using a KTN crystal described above, an electric field is applied in a direction perpendicular to an optical axis. On the other hand, in order to drive a wavelength tunable optical filter at lower drive voltage, a technique has been proposed in which transparent electrodes are used to apply an electric field in a direction parallel to an optical axis. According to this technique, the thickness of a KTN crystal can be reduced, and the distance between electrodes can be designed to be short, which allows the reduction of a required drive voltage.

As illustrated in FIG. 5, the relative permittivity of a KTN crystal has temperature dependence, and the relative permittivity changes significantly with the changes in temperature. In the wavelength tunable optical filter using a KTN crystal, wavelength tuning is accomplished by changing the thickness of a plate-like KTN crystal by an electric field applied. Because the change in thickness is proportional to the square of the relative permittivity, the KTN crystal in which the relative permittivity changes significantly with the changes in temperature as described above cannot accomplish proper wavelength tuning (optical filter operation) in an unstable temperature condition.

For that reason, a Peltier element is usually used to control the temperature of a KTN crystal. However, in the above-described wavelength tunable optical filter having a configuration in which an electric field is applied in a direction parallel to an optical axis, a Peltier element is installed on a side surface of the plate-like KTN crystal. Therefore, the area of a portion where temperature control is substantially performed by the Peltier element is small. Accordingly, performing temperature control on a side surface of a plate-like KTN crystal causes a thermal distribution in the KTN crystal. Because the relative permittivity changes significantly with the changes in temperature as described above, even with temperature control by a Peltier element, the above-described thermal distribution may impair a proper wavelength tuning operation.

As described above, in the related art, a wavelength tunable optical filter using plate-like components having a structure in which an electric field is applied in a direction parallel to an optical axis cannot accomplish proper wavelength tuning operation in an unstable temperature condition.

In response to the above issue, it is an object of embodiments of the present invention to allow a wavelength tunable optical filter using plate-like components having a structure in which an electric field is applied in a direction parallel to an optical axis to accomplish proper wavelength tuning operation also in an unstable temperature condition.

Means for Solving the Problem

A wavelength tunable device according to embodiments of the present invention includes a first component having a plate-like shape, and being made of material that has an electrostrictive effect and allows light to pass through, the first component including a first incident surface and a first emission surface on an opposite side of the first component to the first incident surface, and the first incident surface and the first emission surface being arranged on an optical axis; a second component having a plate-like shape, and being made of material that allows the light to pass through, the second component including a second incident surface and a second emission surface on an opposite side of the second component to the second incident surface, the second incident surface and the second emission surface being arranged on the optical axis, and a distance between the first incident surface and the second incident surface on the optical axis being constant; a first reflective film being formed on the first emission surface and partially reflecting the light; a first transparent electrode being formed on the first incident surface; a second transparent electrode being formed between the first emission surface and the first reflective film; a second reflective film being formed on the second incident surface and partially reflecting the light; and a temperature regulating unit including a Peltier element and being attached on the first incident surface via the first transparent electrode. The first emission surface and the second incident surface are arranged in parallel to face each other.

A distance between the first transparent electrode and the second transparent electrode is smaller than a beam diameter of the light. The first reflective film and the second reflective film constitute a Fabry-Perot interferometer. The temperature regulating unit includes an opening that allows the light to pass through.

Effects of Embodiments of the Invention

As described above, according to embodiments of the present invention, the temperature regulating unit including a Peltier element is installed on the first incident surface of the first component made of light transmissive material having an electrostrictive effect, and thus a wavelength tunable optical filter using plate-like components having a structure in which an electric field is applied in a direction parallel to an optical axis can accomplish proper wavelength tuning operation even in an unstable temperature condition.

DETAILED DESCRIPTION OF ILLUSTRATIVE EMBODIMENTS

Hereinafter, a wavelength tunable device according to an embodiment of the present invention will be described.

First Embodiment

Figure 1A:
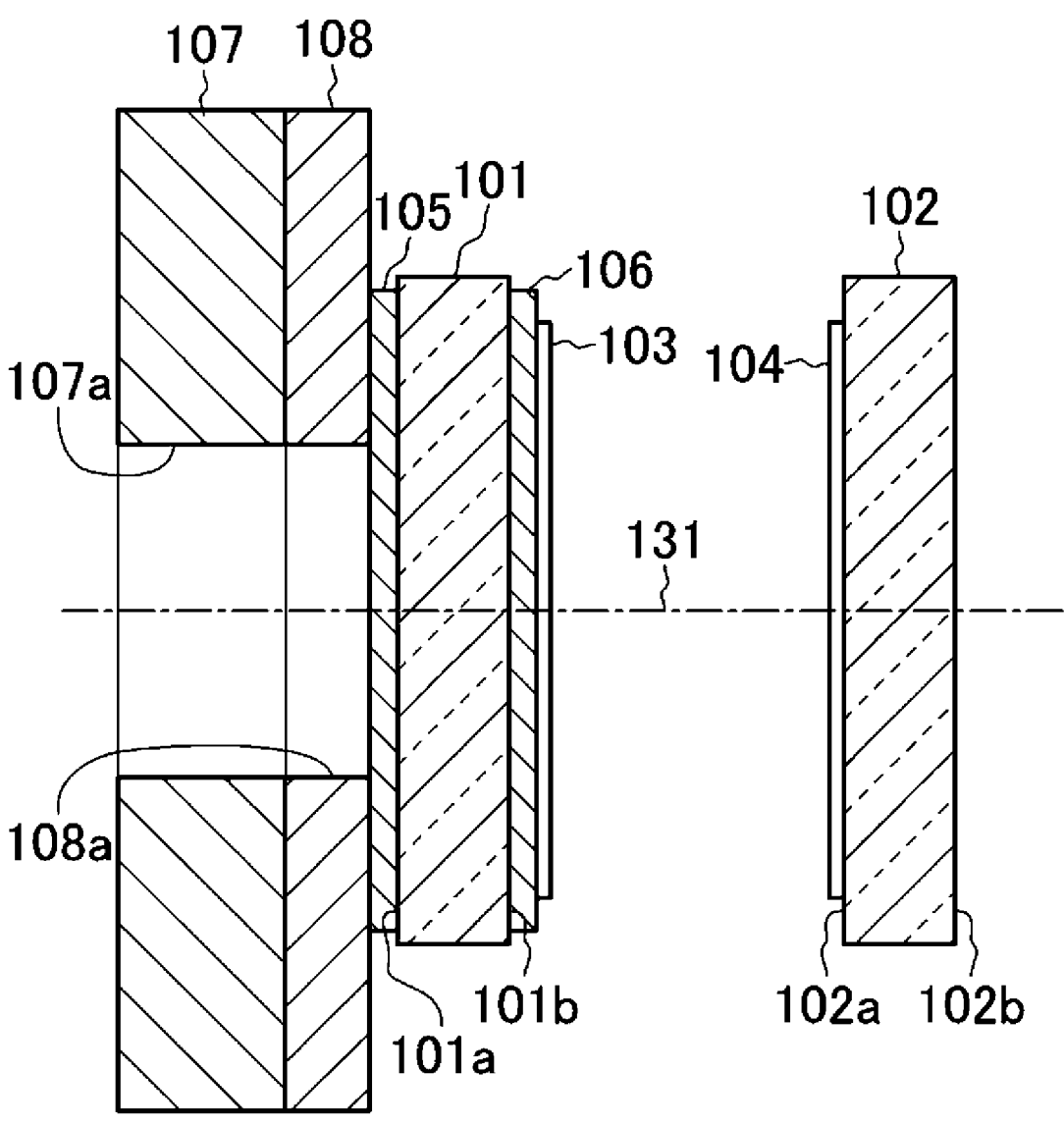
FIG. 1A is a cross-sectional view illustrating a configuration of a wavelength tunable device according to a first embodiment of the present invention.
Figure 1B:
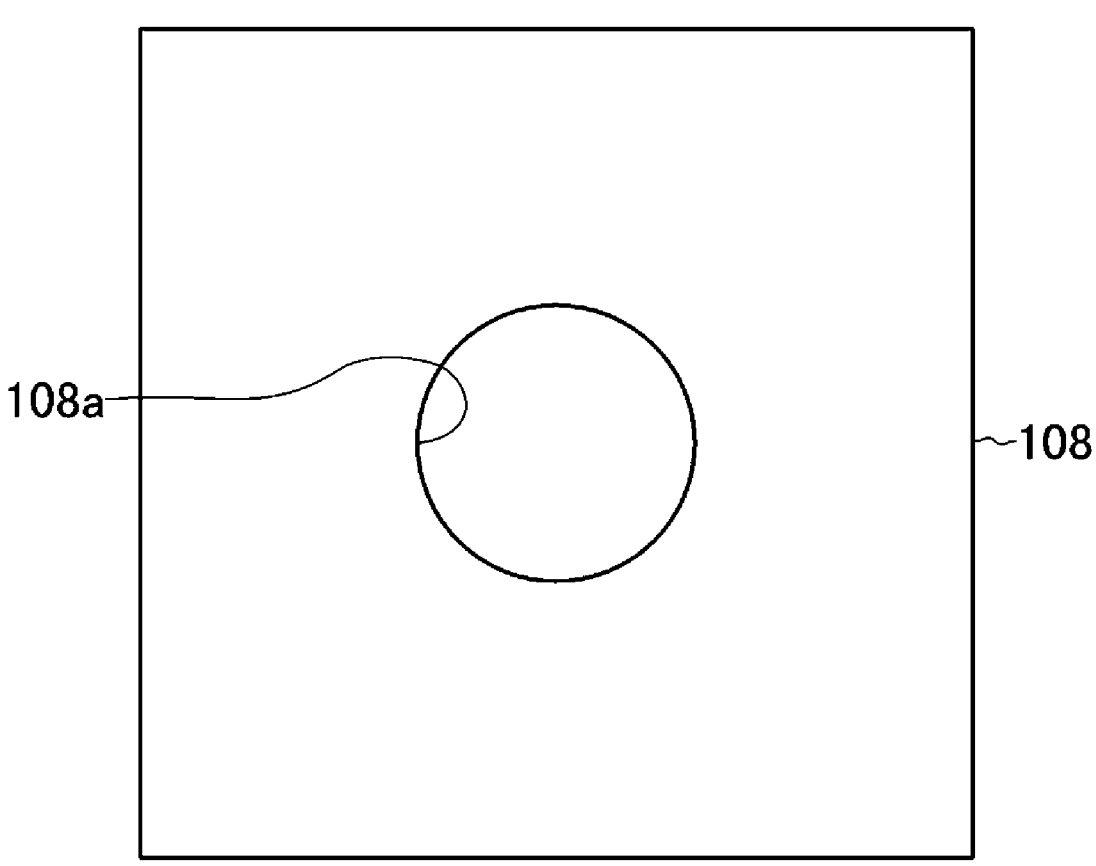
FIG. 1B is a plan view illustrating a partial configuration of a wavelength tunable device according to a first embodiment of the present invention.

First, a wavelength tunable device according to the first embodiment of the present invention will be described with reference to FIGS. 1A and 2B.

The wavelength tunable device includes a first component 101 having a plate-like shape, a second component 102 having a plate-like shape, a first reflective film 103, a second reflective film 104, a first transparent electrode 105, a second transparent electrode 106, and a temperature regulating unit 107.

The first component 101 includes a first incident surface 101a and a first emission surface 101b opposite to the first incident surface 101a. The first component 101 is made of light transmissive material having an electrostrictive effect. The first component 101 can be made of, for example, dielectric material having an electrostrictive effect. The first component 101 is made of material having high transparency to light of target wavelength bands.

The first component 101 can be made of, for example, either of KTN [$KTa_{1-\alpha}Nb_{\alpha}O_3$ ($0<\alpha<1$)] crystal or KLTN [$K_{1-\beta}Li_{\beta}Ta_{1-\alpha}Nb_{\alpha}O_3$ ($0<\alpha<1$, $0<\beta<1$)] crystal with lithium being added. KTN crystals and KLTN crystals are known as crystals having an electrostrictive effect. The electrostrictive effect of these crystals is known to be able to cause a strain amount proportional to the square of an electric field defined by voltage/interelectrode distance. Alternatively, the first component 101 may be made of barium titanate ($BaTiO_3$), lithium niobate ($LiNbO_3$), calcium fluoride ($CaF_2$), and the like. In the first component 101, it is desired that the surface accuracy (maximum shape error) of the first incident surface 101a and the first emission surface 101b is about one tenth of a target light wavelength.

The second component 102 includes a second incident surface 102a and a second emission surface 102b opposite to the second incident surface 102a. The second component 102 is made of light transmissive material. The second component 102 can be made of material having high transparency to light of target wavelength bands. The second component 102 can be formed of, for example, BK7 glass or quartz glass.

The first incident surface 101a and the first emission surface 101b of the first component 101 are arranged on an optical axis (light path) 131, and the second incident surface 102a and the second emission surface 102b of the second component 102 are also arranged on the optical axis 131. In addition, the distance between the first incident surface 101a and the second incident surface 102a is constant on the optical axis 131. For example, when the first component 101 and the second component 102 are fixedly arranged on a surface plate (not illustrated), the distance between the first incident surface 101a and the second incident surface 102a can be fixed on the optical axis 131.

The first reflective film 103 is formed on the first emission surface 101b (via the second transparent electrode 106) and partially reflects light. The second reflective film 104 is formed on the second incident surface 102a, and partially reflects light. The first reflective film 103 and the second reflective film 104 constitute a Fabry-Perot interferometer.

Here, the first emission surface 101b and the second incident surface 102a can be arranged so as to face each other and to be parallel to each other. The first incident surface 101a and the first emission surface 101b can be parallel to each other. Similarly, the second incident surface 102a and the second emission surface 102b can be parallel to each other.

The first transparent electrode 105 is formed on the first incident surface 101a, and the second transparent electrode 106 is formed between the first emission surface 101b and the first reflective film 103. The first transparent electrode 105 and the second transparent electrode 106 can be made of, for example, indium tin oxide (ITO). The distance between the first transparent electrode 105 and the second transparent electrode 106, that is, the plate thickness of the first component 101 is smaller than the beam diameter of light.

The temperature regulating unit 107 is attached on the first incident surface 101a via the first transparent electrode 105. The temperature regulating unit 107 is composed of a Peltier element. The temperature regulating unit 107 includes an opening 107a through which target light can pass. The temperature regulating unit 107 has, for example, a rectangular parallelepiped outer shape in which a surface perpendicular to the optical axis 131 is square-shaped. The opening 107a is formed to penetrate through the temperature regulating unit 107 in a direction perpendicular to the optical axis 131 and has a circular shape in a plan view.

Further, in the first embodiment, a jig 108 is provided so that the temperature regulating unit 107 is attached on the first incident surface 101a via the first transparent electrode 105 by using the jig 108. The jig 108 is attached in contact with the first transparent electrode 105. The jig 108 transfers heat between the first component 101 and the temperature regulating unit 107. The jig 108 also includes an opening 108a through which target light can pass. The jig 108 also has a rectangular parallelepiped outer shape in which a surface perpendicular to the optical axis 131 is square-shaped. The opening 108a is also formed to penetrate through the jig 108 in a direction perpendicular to the optical axis 131 and has a circular shape in a plan view. The jig 108 is made of, for example, highly-rigid material having a high thermal conductivity such as aluminum nitride.

The jig 108 can be bonded to the first transparent electrode 105 with an adhesive having a high thermal conductivity of about 5 W/(m*K), for example. Similarly, the temperature regulating unit 107 can be bonded to the jig 108 with an adhesive having a high thermal conductivity of about 5 W/(m*K).

The temperature regulating unit 107 controls the temperature of the first component 101. The temperature regulating unit 107 can control the temperature of the first component 101 most efficiently when attached to the first component 101 without using the jig 108 or the like. However, when there is a possibility that the temperature regulating unit 107 will undergo deformation or the like during temperature control operation or the like and consequently apply stress to the first component 101, the jig 108 is used to prevent this. For this reason, when the jig 108 is used, it is desired to make the jig 108 from material having a thermal conductivity that enables the temperature regulating unit 107 to sufficiently control the temperature of the first component 101. The jig 108 is preferably made of material having a thermal conductivity greater than 100 W/(m*K) in the vicinity of a room temperature (25° C.). Besides, the jig 108 is preferably made of material having a Young's modulus, which indicates rigidity, of greater than 300 GPa.

For example, the distance (interval) between the first transparent electrode 105 and the second transparent electrode 106 can be 0.1 mm, the distance (distance on the optical axis) between the reflective surface of the first reflective film 103 and the reflective surface of the second reflective film 104 can be 10 μm, and the reflectance of the first reflective film 103 and the second reflective film 104 can be 99.5%. In this configuration, the plate thickness of the first component 101 is 0.1 mm. With this configuration, applying a voltage of 120 V between the first transparent electrode 105 and the second transparent electrode 106 can cause a strain amount of 700 nm in the first component 101. The distance (distance on the optical axis) between the reflective surface of the first reflective film 103 and the reflective surface of the second reflective film 104 changes depending on the change in the strain amount. The change described above allows the wavelength tunable device based on Fabry-Perot interferometer according to the first embodiment to have a filter width of 0.2 nm with respect to wavelengths in 1550 nm band, which allows a 100 nm wavelength sweep.

As described above, in the wavelength tunable device according to the first embodiment, the first component 101 whose temperature is to be controlled has a thin plate thickness of 0.1 mm. Assuming that the plate surface of the first component 101 has a size of 5 mm×5 mm, then its side surface on which a Peltier element can be installed has a size of 5 mm×0.1 mm, which is about 1% of the total surface area. As just described, when temperature control is performed by installing a Peltier element on a side surface of the thin first component 101, the installation area is significantly small, and thus a sufficient temperature control function cannot be achieved. As a result, when ambient temperature changes, proper wavelength tuning operation is impaired.

In contrast to the above description, the first embodiment allows a wide installation area to be obtained by installing the temperature regulating unit 107 on a surface perpendicular to the optical axis of the first component 101. For example, assuming that the first incident surface 101a of the first component 101 has a size of 5×5 mm and has a plate thickness of 0.1 mm, and the temperature regulating unit 107 including the opening 107a having a diameter of 3 mm is attached on the first incident surface 101a, then temperature control can be performed in an area approximately 34% of the total surface area. This value is equivalent to 34 times the value in the related art.

In such a wavelength tunable optical filter, it is preferable to reduce the thickness of a crystal (first component 101) in a traveling direction of light to lower a drive voltage. For this reason, the area of a surface of the first component 101 that is horizontal to an optical axis is small (1 mm² or less), and the area of a surface that is perpendicular to the optical axis and is desired to be at least as large as a beam diameter is large (several 10 mm²). Because installation of the temperature regulating unit 107 on the first incident surface 101a having such a large area allows a wide installation area to be obtained, the first embodiment provides a sufficient temperature control function for the first component 101.

Second Embodiment

Figure 2:
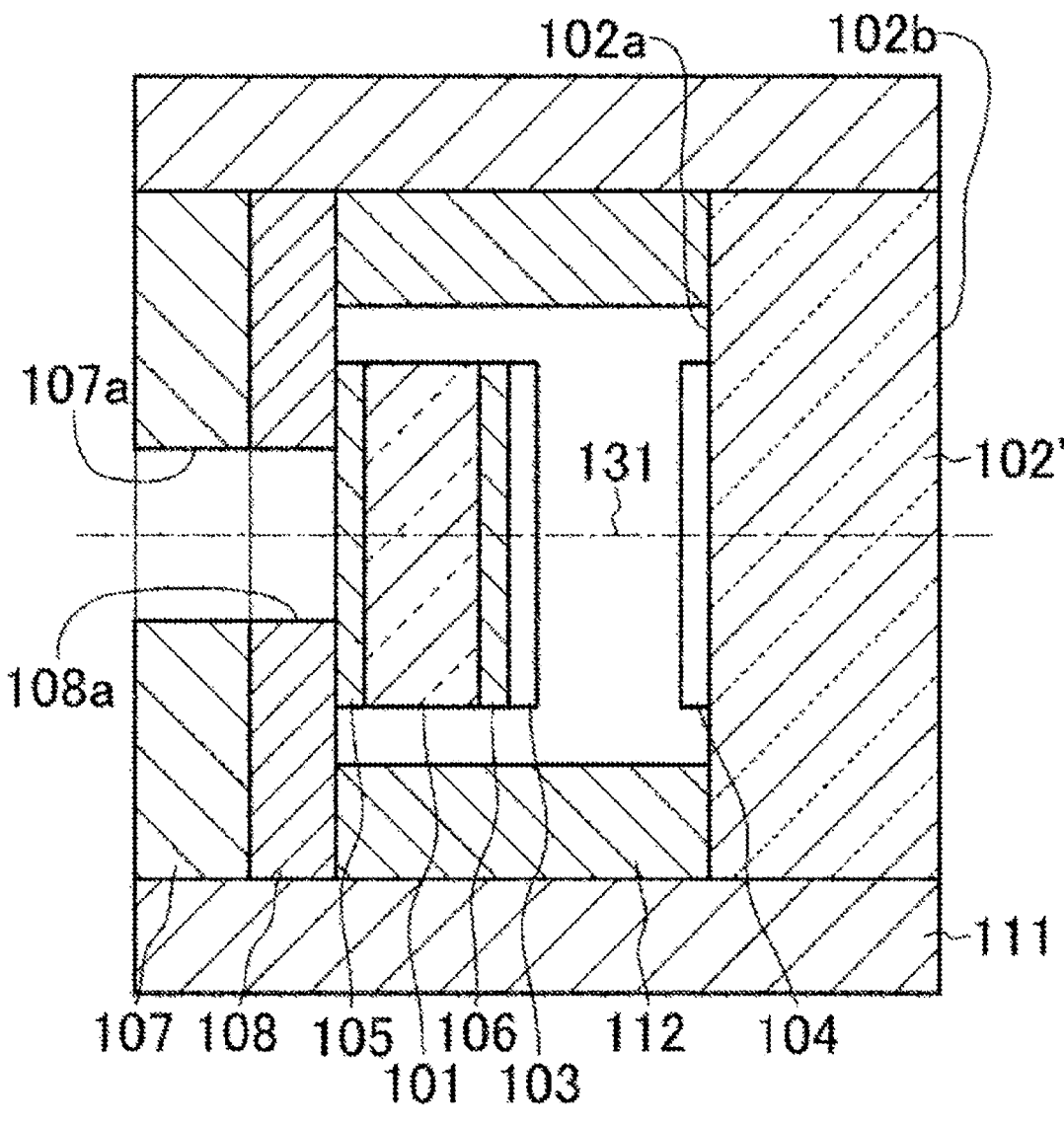
FIG. 2 is a cross-sectional view illustrating a configuration of a wavelength tunable device according to a second embodiment of the present invention.

Next, a wavelength tunable device according to the second embodiment of the present invention will be described with reference to FIG. 2. The wavelength tunable device includes the first component 101, the first reflective film 103, the second reflective film 104, the first transparent electrode 105, the second transparent electrode 106, the temperature regulating unit 107, and the jig 108. These configurations are similar to those of the first embodiment described above. In the second embodiment, a second component 102' in which the area of a surface perpendicular to the optical axis 131 is larger than that of the first component 101 is used.

Further, in the second embodiment, a container 111 that accommodates the first component 101 and the second component 102' is provided. The container 111 is composed of a Peltier element. The container 111 is, for example, a tube having a square outer shape. The second component 102' is arranged such that its side surfaces sandwiched between the second incident surface 102a and the second emission surface 102b are in contact with the inner peripheral surface of the container 111. The side surfaces of the second component 102' are bonded to the inner peripheral surface of the container 111.

The side surfaces of the temperature regulating unit 107 and the jig 108 are bonded and fixed to the inner peripheral surface of the container 111. A spacer 112 having a tubular shape is arranged between the jig 108 and the second component 102' inside the container 111. The spacer 112 can be made of the same material as the jig 108. The spacer 112 maintains a constant distance between the jig 108 and the second component 102'.

Figure 3:
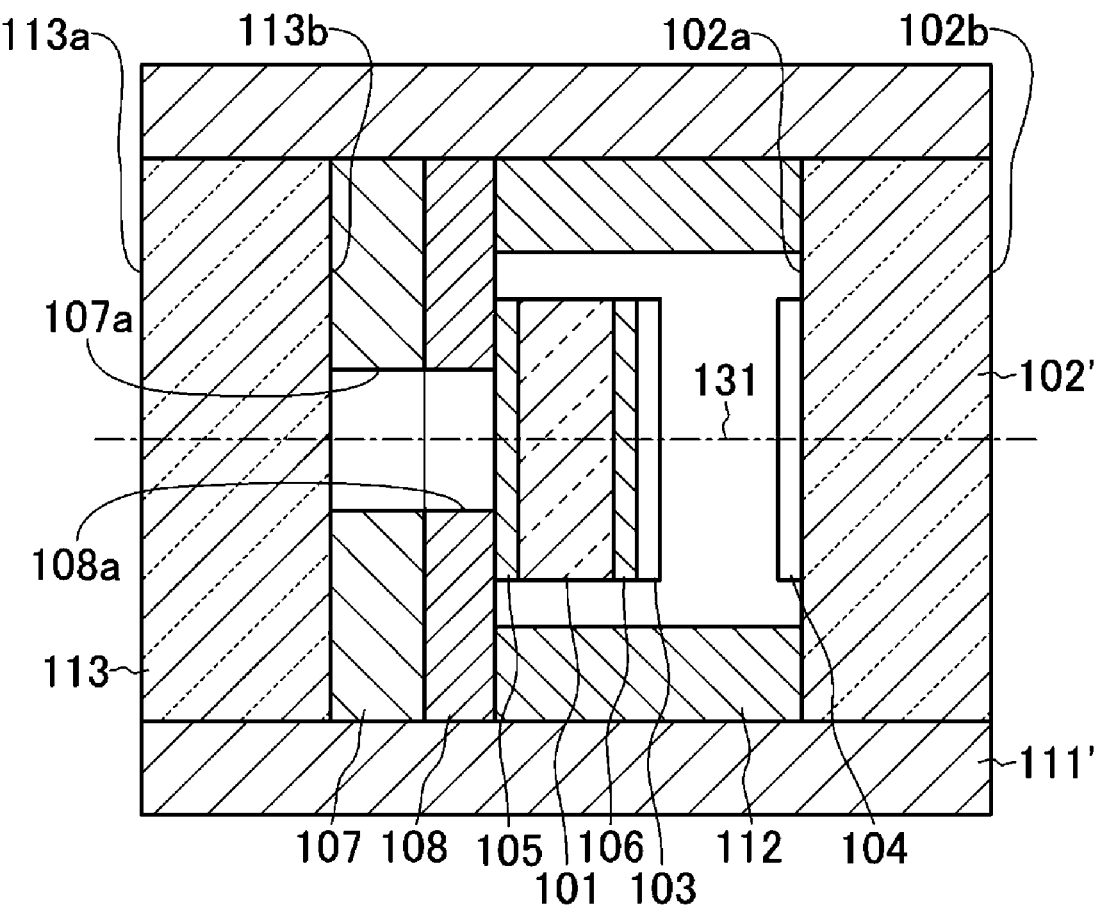
FIG. 3 is a cross-sectional view illustrating a configuration of a wavelength tunable device according to a third embodiment of the present invention.

As illustrated in FIG. 3, in addition to the first component 101 and the second component 102, a third part 113 having a plate-like shape can be accommodated in a container 111' composed of a Peltier element. The third part 113 is made of light transmissive material and includes a third incident surface 113a and a third emission surface 113b opposite to the third incident surface 113a. Further, the third part 113 is arranged proximate to the first incident surface 101a of the first component 101 and accommodated in the container 111', while the third incident surface 113a and the third emission surface 113b are arranged on the optical axis 131. Furthermore, the third part 113 is arranged such that its side surfaces sandwiched between the third incident surface 113a and the third emission surface 113b are in contact with (bonded to) the inner peripheral surface of the container 111.

As described above, by using the container 111 or the container 111' composed of a Peltier element to house the first component 101 and the like, the thermal distribution in the first component 101 can be further reduced. By using the third part 113, the total size of the container 111' (module) can be adjusted. By housing the second component 102 and the third part 113 in the container 111' to form a module, it is possible to control the temperature of the whole module.

With such a configuration, variations in temperature due to radiation from the jig 108, the spacer 112, and the second component 102' can be reduced. When the first reflective film 103 and the second reflective film 104 are formed of a dielectric multilayer film, transmittance and reflectance also have temperature dependence. For this reason, in order to stabilize the temperature of the first reflective film 103 and the second reflective film 104, it is useful to control the temperature of the whole module by using the container 111 or the container 111' as described above.

Incidentally, in the case where the first component 101 is made of a KTN crystal, the KTN is used in a cubic crystal state, and thus the wavelength tunable device is operated at a temperature around 40° C. which is higher than room temperature. Therefore, after the wavelength tunable device is activated, the first component 101 is heated to T° C. (>room temperature) which is an ideal drive temperature of the KTN crystal. Then, during operation as a practical filter, because the KTN crystal generates heat, the first component 101 is maintained at (cooled to) T° C. The temperature control described above is performed by the temperature regulating unit 107 and the container 111 (container 111'). In this way, according to the present embodiment, the module structure described above allows the thermal distribution in the first component 101 to be controlled uniformly at a high speed.

Third Embodiment

Figure 4:
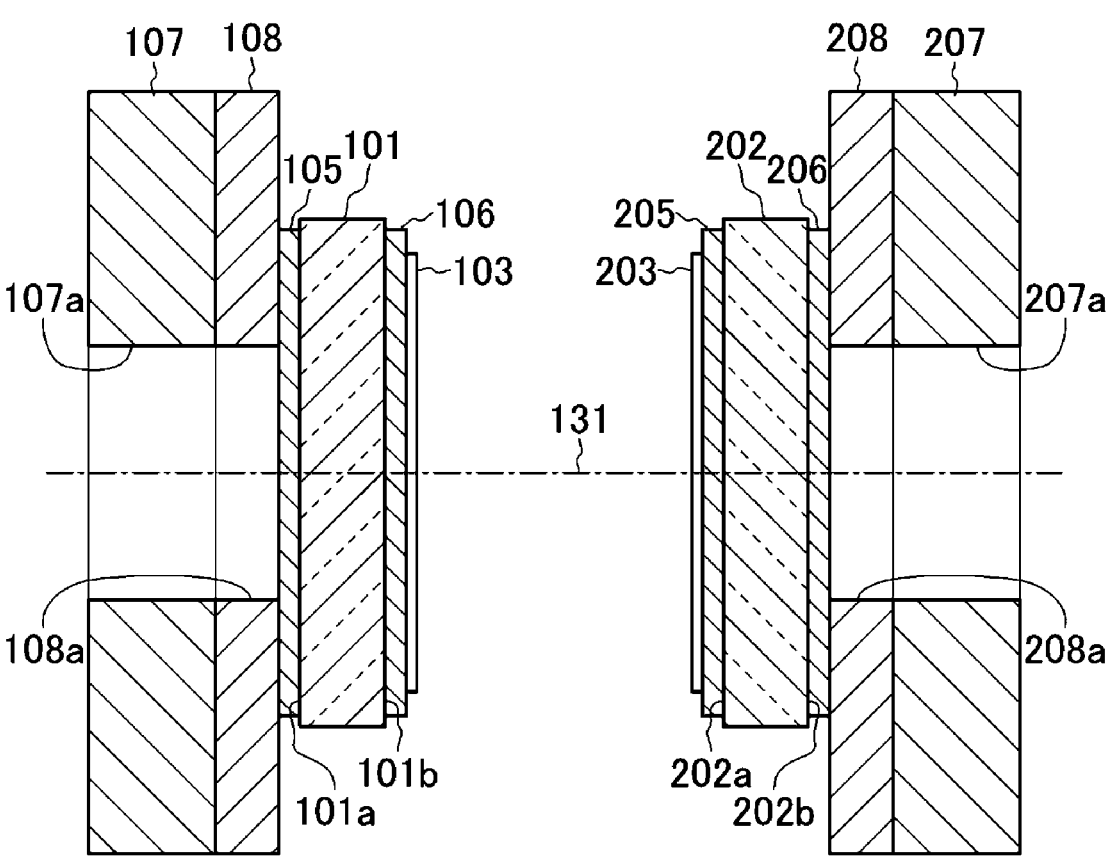
FIG. 4 is a cross-sectional view illustrating a configuration of a wavelength tunable device according to a fourth embodiment of the present invention.
Figure 5:
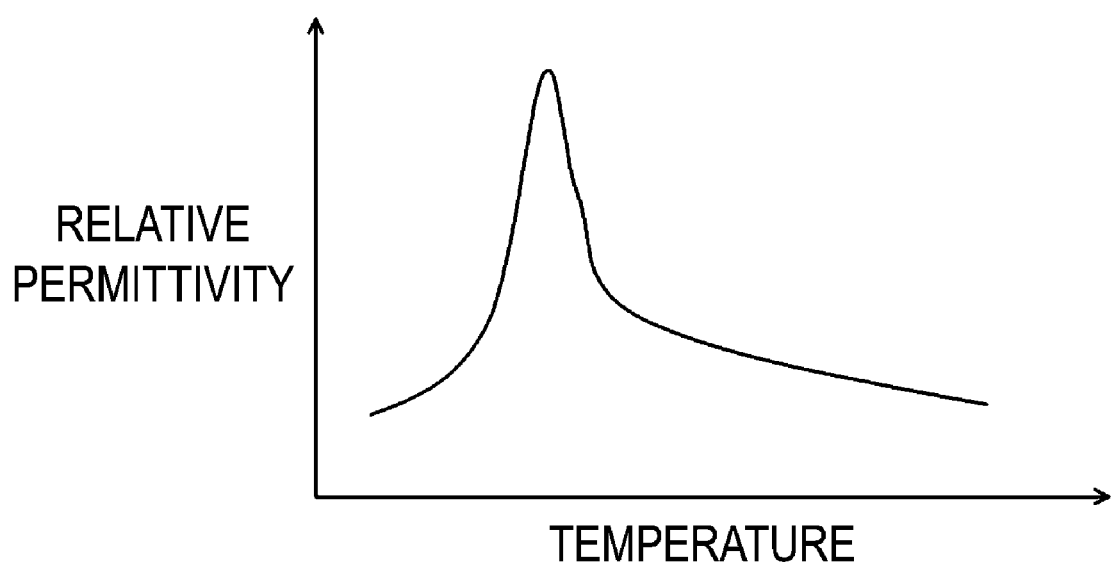
FIG. 5 is a characteristic diagram illustrating a relationship between the relative permittivity of a KTN crystal and temperature.

Next, a wavelength tunable device according to the third embodiment of the present invention will be described with reference to FIG. 4.

The wavelength tunable device includes the first component 101, the first reflective film 103, the first transparent electrode 105, the second transparent electrode 106, the temperature regulating unit 107, and the jig 108. These configurations are similar to those of the first embodiment described above.

In the third embodiment, a second component 202 having a plate-like shape, a second reflective film 204, a third transparent electrode 205, a fourth transparent electrode 206, a another temperature regulating unit 207, and a jig 208 are provided.

The second component 202 includes a second incident surface 202a and a second emission surface 202b opposite to the second incident surface 202a. The second component 202 is made of light transmissive material having an electrostrictive effect. The second component 202 can be made of, for example, dielectric material having an electrostrictive effect. The second component 202 is made of material having high transparency to light of target wavelength bands.

As in the case of the first component 101, the second component 202 can be made of, for example, either of KTN [$KTa_{1-\alpha}Nb_\alpha O_3$ ($0<\alpha<1$)] crystal or KLTN [$K_{1-\beta}Li_\beta Ta_{1-\alpha}Nb_\alpha O_3$ ($0<\alpha<1$, $0<\beta<1$)] crystal with lithium being added.

Alternatively, as in the case of the first component 101, the second component 202 may be made of barium titanate ($BaTiO_3$), lithium niobate ($LiNbO_3$), calcium fluoride ($CaF_2$), and the like. Also in the second component 202, it is desired that the surface accuracy (maximum shape error) of the second incident surface 202a and the second emission surface 202b is about one tenth of a target light wavelength.

Here, the second incident surface 202a and the second emission surface 202b of the second component 202 are arranged on the optical axis 131. In addition, the distance between the first incident surface 101a and the second incident surface 202a is constant on the optical axis 131. For example, when the first component 101 and the second component 202 are fixedly arranged on a surface plate (not illustrated), the distance between the first incident surface 101a and the second incident surface 202a can be fixed on the optical axis 131.

The second reflective film 204 is formed on the second incident surface 202a, and partially reflects light. The first reflective film 103 and the second reflective film 204 constitute a Fabry-Perot interferometer.

The first emission surface 101b and the second incident surface 202a are arranged so as to face each other and to be parallel to each other. The second incident surface 202a and the second emission surface 202b are parallel to each other.

The third transparent electrode 205 is formed on the second incident surface 202a, and the fourth transparent electrode 206 is formed on the second emission surface 202b. The third transparent electrode 205 and the fourth transparent electrode 206 can be made of, for example, ITO. The distance between the third transparent electrode 205 and the fourth transparent electrode 206, that is, the plate thickness of the second component 202 is smaller than the beam diameter of light.

Further, in the third embodiment, a another temperature regulating unit 207 composed of a Peltier element is provided and attached on the second emission surface 202b. The other temperature regulating unit 207 is attached on the second emission surface 202b via the fourth transparent electrode 206. The other temperature regulating unit 207 includes an opening 207a through which light can pass. The other temperature regulating unit 207 is composed of a Peltier element. The other temperature regulating unit 207 includes the opening 207a through which target light can pass. The other temperature regulating unit 207 has, for example, a rectangular parallelepiped outer shape in which a surface perpendicular to the optical axis 131 is square-shaped. The opening 207a is formed to penetrate through the other temperature regulating unit 207 in a direction perpendicular to the optical axis 131, and the opening 107a has a circular shape in a plan view.

Further, in the third embodiment, a jig 208 is provided so that the other temperature regulating unit 207 is attached on the second emission surface 202*b* via the fourth transparent electrode 206 by use of the jig 208. The jig 208 is attached in contact with the fourth transparent electrode 206. The jig 208 transfers heat between the second component 202 and the other temperature regulating unit 207. The jig 208 also includes an opening 208*a* through which target light can pass. Further, the jig 208 has a rectangular parallelepiped outer shape in which a surface perpendicular to the optical axis 131 is square-shaped. The opening 208*a* is also formed to penetrate through the jig 208 in a direction perpendicular to the optical axis 131 and has a circular shape in a plan view. The jig 208 is made of, for example, highly-rigid material having a high thermal conductivity such as aluminum nitride.

The third embodiment differs from the first embodiment in that the second component 202 is made of light transmissive material having an electrostrictive effect, and the other temperature regulating unit 207 is attached on the second component 202 to allow temperature control in a similar way to the first component 101.

According to the third embodiment, proper wavelength tuning operation can be accomplished also in an unstable temperature condition, as in the case of the first embodiment. In addition, also in the third embodiment, the first component 101, the temperature regulating unit 107, the jig 108, the second component 202, the other temperature regulating unit 207, the jig 208, and the like can be accommodated in a container composed of a Peltier element, as in the case of the second embodiment.

As described above, according to embodiments of the present invention, the temperature regulating unit composed of a Peltier element is attached to the first incident surface of the first component made of light transmissive material having an electrostrictive effect, and thus the wavelength tunable optical filter using plate-like components having a structure in which an electric field is applied in a direction parallel to an optical axis can accomplish proper wavelength tuning operation also in an unstable temperature condition.

Meanwhile, the present invention is not limited to the embodiments described above, and it will be obvious to those skilled in the art that various modifications and combinations can be implemented within the technical idea of the present invention.

REFERENCE SIGNS LIST

101 First component
101*a* First incident surface
101*b* First emission surface
102 Second component
102*a* Second incident surface
102*b* Second emission surface
103 First reflective film
104 Second reflective film
105 First transparent electrode
106 Second transparent electrode
107 Temperature regulating unit
107*a* Opening
108 Jig
108*a* Opening.

The invention claimed is:
1. A wavelength tunable device comprising:
a first component having a plate-like shape, and being made of material that has an electrostrictive effect and configured to allow light to pass through, the first component including a first incident surface and a first emission surface on an opposite side of the first component to the first incident surface, and the first incident surface and the first emission surface being arranged on an optical axis;
a second component having a plate-like shape, and being made of material that is configured to allow the light to pass through, the second component including a second incident surface and a second emission surface on an opposite side of the second component to the second incident surface, the second incident surface and the second emission surface being arranged on the optical axis, and a distance between the first incident surface and the second incident surface on the optical axis being constant between the first component and the second component;
a first reflective film on the first emission surface and configured to partially reflect the light;
a first transparent electrode on the first incident surface;
a second transparent electrode between the first emission surface and the first reflective film;
a second reflective film on the second incident surface and configured to partially reflect the light; and
a temperature regulator including a Peltier element, the temperature regulator being attached to the first incident surface via the first transparent electrode, wherein:
the first emission surface and the second incident surface are arranged in parallel to face each other,
a distance between the first transparent electrode and the second transparent electrode is smaller than a beam diameter of the light,
the first reflective film and the second reflective film constitute a Fabry-Perot interferometer, and
the temperature regulator includes an opening that is configured to allow the light to pass through.
2. The wavelength tunable device according to claim 1, wherein:
the temperature regulator is attached to the first incident surface via the first transparent electrode by a jig that transfers heat between the first component and the temperature regulator; and
the jig includes an opening that allows the light to pass through.
3. The wavelength tunable device according to claim 1, further comprising:
a container including a Peltier element and accommodating the first component and the second component, wherein side surfaces of the second component that are sandwiched between the second incident surface and the second emission surface are arranged in contact with an inner peripheral surface of the container.
4. The wavelength tunable device according to claim 3, further comprising:
a third part having a plate-like shape, being made of a material that is configured to allow the light to pass through, and including a third incident surface on a side of the third part and a third emission surface on a side of the third part opposite to the third incident surface, the third incident surface and the third emission surface being arranged on the optical axis, the third part being arranged proximate to the first incident surface of the first component and being accommodated in the container, wherein side surfaces of the third part that are sandwiched between the third incident surface and the third emission surface are arranged in contact with the inner peripheral surface of the container.

5. The wavelength tunable device according to claim 1, wherein:

the first component is made of either KTN [$KTa_{1-\alpha}Nb_{\alpha}O_3$ ($0<\alpha<1$)] crystal or KLTN [$K_{1-\beta}Li_{\beta}Ta_{1-\alpha}Nb_{\alpha}O_3$ ($0<\alpha<1$, $0<\beta<1$)] crystal with lithium added.

6. The wavelength tunable device according to claim 1, further comprising another temperature regulator including a Peltier element and being attached to the second emission surface, wherein:

the second component is made of either KTN [$KTa_{1-\alpha}Nb_{\alpha}O_3$ ($0<\alpha<1$)] crystal or KLTN [$K_{1-\beta}Li_{\beta}Ta_{1-\alpha}Nb_{\alpha}O_3$ ($0<\alpha<1$, $0<\beta<1$)] crystal with lithium added; and the other temperature regulator includes an opening that is configured to allow the light to pass through.

7. The wavelength tunable device according to claim 1, wherein:

the first transparent electrode and the second transparent electrode are made of indium tin oxide.

8. A wavelength tunable device comprising:

a first component having a plate-like shape, and being made of a material that has an electrostrictive effect and configured to allow light to pass through, the first component including a first incident surface and a first emission surface on an opposite side of the first component to the first incident surface, and the first incident surface and the first emission surface being arranged on an optical axis;

a second component having a plate-like shape, and being made of material that is configured to allow the light to pass through, the second component including a second incident surface and a second emission surface on an opposite side of the second component to the second incident surface, the second incident surface and the second emission surface being arranged on the optical axis, and a distance between the first incident surface and the second incident surface on the optical axis being constant between the first component and the second component;

a first reflective film on the first emission surface, the first reflective film being configured to partially reflect the light;

a first transparent electrode on the first incident surface;

a second transparent electrode between the first emission surface and the first reflective film;

a second reflective film on the second incident surface, the second reflective film being configured to partially reflect the light; and a first temperature regulator including a Peltier element and being attached to the first incident surface via the first transparent electrode, wherein the first emission surface and the second incident surface are arranged in parallel to face each other, the first reflective film and the second reflective film constitute a Fabry-Perot interferometer, and the first temperature regulator includes an opening configured to allow the light to pass through.

9. The wavelength tunable device according to claim 8, wherein a distance between the first transparent electrode and the second transparent electrode is smaller than a beam diameter of the light.

10. The wavelength tunable device according to claim 8, further comprising:

a jig configured to attach the first temperature regulator on the first incident surface via the first transparent electrode and transfer heat between the first component and the first temperature regulator.

11. The wavelength tunable device according to claim 10, wherein the jig includes an opening configured to allow the light to pass through.

12. The wavelength tunable device according to claim 8, further comprising:

a container including a Peltier element and accommodating the first component and the second component, wherein side surfaces of the second component that are sandwiched between the second incident surface and the second emission surface are arranged in contact with an inner peripheral surface of the container.

13. The wavelength tunable device according to claim 12, further comprising:

a third part having a plate-like shape, being made of material that is configured to allow the light to pass through, and including a third incident surface on a side of the third part and a third emission surface on a side of the third part opposite to the third incident surface, the third incident surface and the third emission surface being arranged on the optical axis, the third part being arranged proximate to the first incident surface of the first component and being accommodated in the container, wherein side surfaces of the third part that are sandwiched between the third incident surface and the third emission surface are arranged in contact with the inner peripheral surface of the container.

14. The wavelength tunable device according to claim 8, wherein: the first component is made of either KTN [$KTa_{1-\alpha}Nb_{\alpha}O_3$ ($0<\alpha<1$)] crystal or KLTN [$K_{1-\beta}Li_{\beta}Ta_{1-\alpha}Nb_{\alpha}O_3$ ($0<\alpha<1$, $0<\beta<1$)] crystal with lithium added.

15. The wavelength tunable device according to claim 8, wherein:

the second component is made of either KTN [$KTa_{1-\alpha}Nb_{\alpha}O_3$ ($0<\alpha<1$)] crystal or KLTN [$K_{1-\beta}Li_{\beta}Ta_{1-\alpha}Nb_{\alpha}O_3$ ($0<\alpha<1$, $0<\beta<1$)] crystal with lithium added.

16. The wavelength tunable device according to claim 8, further comprising:

a second temperature regulator including a Peltier element and being attached to the second emission surface.

17. The wavelength tunable device according to claim 16, wherein:

the second temperature regulator includes an opening configured to allow the light to pass through.

18. The wavelength tunable device according to claim 8, wherein:

the first transparent electrode and the second transparent electrode are made of indium tin oxide.

* * * * *